UNITED STATES PATENT OFFICE 2,489,247

PYRIDINE QUATERNARY SALTS

Heinz M. Wuest, Montclair, N. J., assignor to William R. Warner & Co. Inc., New York, N. Y., a corporation of Delaware No Drawing. Original application January 4, 1949, Serial No. 69,240. Divided and this application September 19, 1949, Serial No. 116,637. In Canada December 22, 1948

5 Claims. (Cl. 260—295.5)

This invention relates to new pharmaceutical products, specifically to products having physostigmine-like action capable of stimulating the parasympathetic nervous system.

This application is a division of my copending application Serial No. 69,240, filed January 4, 1949, which, in turn, is a continuation-in-part of my applications Serial Nos. 22,509, now abandoned, and 22,510, now abandoned, filed April 21, 1948.

In accordance with this invention, there are provided aralkyl quaternary salts of compounds, having the structural formula

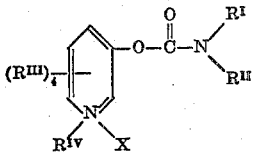

in which $R^I$ and $R^{II}$ denote alkyl, aralkyl, aryl, halogenated aryl or hydroaryl hydrocarbon radicals, which may be the same or different and each of which preferably contains not more than 10 carbon atoms, and together may form a polymethylene radical containing not over 5 carbon atoms; $R^{III}$ denotes hydrogen or a lower aliphatic or araliphatic hydrocarbon radical, preferably containing not over 10 carbon atoms, said members being the same or different; $R^{IV}$ denotes an aralkyl radical; and X denotes a quaternizing anion. These compounds, I have found, possess physostigmine-like action in that they stimulate peristalsis; decrease intra-ocular pressure in glaucoma; strengthen the paretic muscles in myasthenia gravis; or cause marked reduction in blood pressure.

The compounds of my invention may be prepared readily by reacting a 3-pyridol with a compound having the structural formula

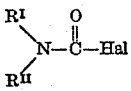

in which $R^I$ and $R^{II}$ are as above defined, and Hal denotes a halogen atom, e. g. chlorine or bromine, and then converting the carbamic acid ester formed to the desired quaternary compound. The term "a 3-pyridol" is used herein to denote not only the specific compound 3-pyridol, but also compounds of the structural formula

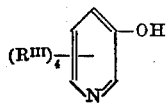

in which $R^{III}$ is as above defined, such as 6-methyl-pyridine-3-ol, 2,6-dimethylpyridine-3-ol, 2,4,6-trimethylpyridine-3-ol, 6-benzyl-2,5-dimethylpyridine-3-ol or 6-styrylpyridine-3-ol. The carbamyl halide reacted with the 3-pyridol may be any compound of the formula

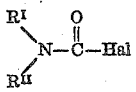

such as dimethylcarbamyl chloride, methyl-p-chlorphenylcarbamyl chloride, diphenylcarbamyl chloride, methylbenzylcarbamyl chloride, methylcyclohexylcarbamyl chloride, methylcyclohexenylcarbamyl chloride, or tetramethylenecarbamyl chloride; corresponding bromides or iodides may also be used. The compound employed to quaternize the carbamic acid esters thus prepared may be an aralkyl halide such as benzyl, phenylethyl or naphthylmethyl chlorides or bromides, their methoxy, ethoxy, halo or nitro derivatives.

I have found that the compounds herein described, in which $R^{IV}$ is aralkyl, have consistently and markedly higher activity as stimulants for the parasympathetic nervous system than do the corresponding compounds in which the radical $R^{IV}$ is alkyl.

In the preparation of the compounds of my invention, the reaction of the 3-pyridol and the carbamyl halide may be carried out at any suitable temperature, e. g. about 80° C., in a solvent such as benzene and in the presence of an acid binding agent such as triethylamine, to absorb the hydrogen halide evolved, the desired ester then being recovered by fractionation. The reaction of the carbamate to form the quaternary compound may be carried out in the presence of a solvent such as benzene at any suitable temperature, e. g. room temperature, and the product recovered, and, if desired, purified by recrystallization.

The products of my invention may be administered parenterally in the form of aqueous solutions or orally in the form of tablets. Extensive pharmacological tests have established that the compounds of my invention possess physostigmine-like properties in that they have the characteristic high toxicity of such drugs; show anticholinesterase activity when tested in the Warburg apparatus; cause marked reduction in blood pressure; produce pronounced contraction of isolated guinea pig intestine, or when tested in vivo, promote intestinal motility.

Among the compounds which may be prepared in accordance with my invention may be mentioned the following:

1-benzyl - 3 - (dimethylcarbamyloxy)-pyridinium bromide;
1-benzyl - 3 - (dimethylcarbamyloxy)-pyridinium chloride;
1-benzyl - 3 - (dimethylcarbamyloxy)-pyridinium dihydrogen phosphate;
1-benzyl - 3 - (dimethylcarbamyloxy)-pyridinium picrate;
1-benzyl - 3 - (tetramethylenecarbamyloxy)-pyridinium bromide;
1 - benzyl - 3 - (dimethylcarbamyloxy)-6-methylpyridinium bromide;
1-benzyl-3-(methyl-p-chlorphenylcarbamyloxy)-pyridinium bromide;
1-(p-methoxybenzyl)-3-(dimethylcarbamyloxy)-pyridinium bromide;
3 - (dimethylcarbamyloxy) - 1 - p-nitrobenzyl)-pyridinium bromide.
1-benzyl-3-(benzylmethylcarbamyloxy) - pyridinium bromide;
1 - benzyl - 3 - (methylcyclohexylcarbamyloxy)-pyridinium bromide;
1 - benzyl-3-(methylcyclohexenylcarbamyloxy)-pyridinium bromide;
1 - benzyl - 3 - (dimethylcarbamyloxy)-6-styrylpyridinium bromide;
3 - (dimethylcarbamyloxy)-1-(2-naphthylmethyl)-pyridinium bromide; and
3 - (dimethylcarbamyloxy)-1-(phenylethyl)-pyridinium bromide.

Typical results of the many pharmacological tests made are tabulated below:

Table I—Toxicity (subcutaneous)

| Compound Tested | Toxic Dose [1] (mouse), mg./kg. | LD₅₀ (mouse), mg./kg. |
|---|---|---|
| 1-benzyl-3-(dimethylcarbamyloxy)-pyridinium bromide | 0.25 | 0.75 |
| 1-benzyl-3-(dimethylcarbamyloxy)-pyridinium chloride | 0.25 | 0.75 |
| 1-benzyl-3-(dimethylcarbamyloxy)-pyridinium dihydrogen phosphate | 0.5 | 1.5 |
| 3-(dimethylcarbamyloxy)-1-(2-naphthylmethyl)-pyridinium bromide | | 1.5 |

[1] Dose required to induce toxic symptoms without causing death.

In the tests next described, a piece of the small intestine isolated from a freshly sacrificed guinea pig was placed in a bath of oxygenated Locke's solution at 37° C., 1 ml. of test solution was added, any contraction in the intestine being noted on a moving kymograph.

Table II

| Compound Tested | Concentration | Contraction (mm.) |
|---|---|---|
| 1-benzyl-3-(dimethylcarbamyloxy)-pyridinium bromide | 1:1,000,000,000 | 37-50 |
| 1-benzyl-3-(dimethylcarbamyloxy)-pyridinium bromide | 1:100,000,000 | 56-80 |
| 1-benzyl-3-(dimethylcarbamyloxy)-pyridinium picrate | 1:10,000,000 | Active. |
| 3-(dimethylcarbamyloxy)-1-(2-naphthylmethyl)-pyridinium bromide | 1:10,000,000 | Active. |

The next series of tests are designed to show effect of my compounds on intestinal motility of anesthetized cats and dogs. The test animals were given the doses indicated intravenously and the motility recorded on a moving kymograph by means of a bromoform manometer connected to a water filled balloon inserted into the ileac portion of the small intestine.

Table III

| Compound Tested | Dose, mg./kg. | Highest Rise in mm. Bromoform | Time of Highest Rise After Dose | Duration of contraction |
|---|---|---|---|---|
| *Cats* | | | *Minutes* | *Minutes* |
| 1-benzyl-3-(dimethylcarbamyloxy)-pyridinium bromide | 0.06 | 55 | 7 | 10 |
| 1-benzyl-3-(dimethylcarbamyloxy)-pyridinium bromide | 0.01 | 115 | 6 | 12 |
| 1-benzyl-3-(dimethylcarbamyloxy)-pyridinium bromide | 0.5 | 122 | 6 | 14 |
| *Dogs* | | | | |
| 1-benzyl-3-(dimethylcarbamyloxy)-pyridinium bromide | 0.03 | 130 | 18 | 120 |
| 1-benzyl-3-(dimethylcarbamyloxy)-pyridinium bromide | 0.06 | 64 | 5 | 25 |
| 1-benzyl-3-(dimethylcarbamyloxy)-pyridinium bromide | 0.12 | 110 | 6 | 14 |

Animal experiments have also indicated that the following compounds produced contraction of the intestine in anesthetized dogs in concentration indicated.

Table IV

| Compound Tested | Dose, mg./kg. |
|---|---|
| 1-benzyl-3-(methyl-p-chlorphenylcarbamyloxy)-phridinium bromide | 0.5 |
| 1-benzyl-3-(tetramethylenecarbamyloxy)-pyridinium bromide | 0.25 |
| 3-(dimethylcarbamyloxy)-1-(2-naphthylmethyl)-pyridinium bromide | 0.1 |
| 3-(dimethylcarbamyloxy)-1-(p-nitrobenzyl)-pyridinium bromide | 0.1 |

The following examples are illustrative of the preparation of compounds of my invention:

*Example 1.*—56 grams of dimethylcarbamyl chloride were gradually added over a period of 50 minutes to a solution of 45 grams of 3-pyridol in a mixture of 300 cc. of benzene and 69 grams of triethylamine. The reaction mass was then agitated at 80° C. for 3 hours and permitted to cool. The triethylamine hydrochloride was removed by filtration and solvents distilled from the filtrate under vacuum in a nitrogen atmosphere. The residual oil was then fractionated under vacuum whereby, after removal of unchanged dimethylcarbamyl chloride, a product distilling at 90° C. at 0.3 mm. was obtained; this product was the dimethylcarbamyl ester of 3-pyridol.

60 grams of the ester prepared as above described were dissolved in 225 cc. of benzene and 92.5 grams of benzyl bromide were added thereto. The solution was stirred at room temperature for 24 hours and refluxed for 3 additional hours. At the end of this time the crude product which formed was separated, washed with benzene and dissolved in water. The aqueous solution was extracted with ether, filtered through charcoal and then evaporated to dryness in a nitrogen atmosphere; traces of water were removed by redissolving the oily residue in absolute alcohol, adding benzene and then evaporating the mixture to dryness under vacuum. The yellow oil thus obtained was then dissolved in a mixture of 300 cc. of benzene and 55 cc. of absolute alcohol under reflux, the solution cooled, and 340 cc. of absolute ether added. The solution was then seeded and maintained at 5° C. for two days. The crystalline product obtained was filtered and dried, a product melting between 115° C. and 116° C. being obtained. This product was the desired 1-benzyl - 3 - (dimethylcarbamyloxy)-pyridinium bromide.

*Example 2.*—8.3 grams of 3-(dimethylcarbamyloxy)-pyridine were dissolved in 50 cc. of benzene, 9.5 grams of benzyl chloride were added thereto, and the solution refluxed for 35 hours. The benzene solution was then separated from the residual oil, and the oil dissolved in absolute alcohol; the resulting solution was saturated with absolute ether, seeded and then permitted to stand. The crystalline solid which formed was recovered by filtration and then recrystallized from a mixture of absolute alcohol and absolute ether. A crystalline solid having a melting point of 118° C. to 120° C. was obtained. Upon analysis this product was found to be the desired 1-benzyl-3-(dimethylcarbamyloxy)-pyridinium chloride.

*Example 3.*—Silver phosphate, prepared by the gradual addition of a solution of 4.97 grams of disodium hydrogen phosphate in 35 cc. of water to a solution of 17.9 grams of silver nitrate in 35 cc. of water, was suspended in 75 cc. of water and a solution of 17.7 grams of the product of Example 1 in 50 cc. of water was added with agitation. The mixture was then centrifuged and the clear solution adjusted to pH 6 with phosphoric acid. Water was then removed by heating under vacuum, and the residual oil was then crystallized from a mixture of absolute alcohol and absolute ether. The resulting yellow needles were further recrystallized three times from absolute alcohol, whereby a product melting between 145° and 146° C. was obtained, which, upon analysis, was found to be the desired 1-benzyl-3-(dimethylcarbamyloxy)-pyridinium dihydrogen phosphate.

*Example 4.*—A solution of 5 grams of the product of Example 1 in 25 cc. of water was gradually added with agitation to a solution of 2.7 grams of picric acid in 200 cc. of water. The yellow precipitate which formed was removed by filtration, washed with water and dried. The yellow solid obtained was then recrystallized from 95% ethanol, a yellow crystalline solid being recovered melting between 120° C. and 121° C. Upon analysis this product was found to be the desired 1-benzyl-3-(dimethylcarbamyloxy)-pyridinium picrate.

*Example 5.*—27.9 grams of N-tetramethylenecarbamyl chloride in 100 cc. of benzene were rapidly added to a boiling solution of 19.8 grams of 3-pyridol in a mixture of 1000 cc. of benzene and 42.4 grams of triethylamine. The mixture was then refluxed for 3 hours, permitted to cool, filtered and solvents removed from the filtrate under vacuum. The residue was then recrystallized from a mixture of benzene and petroleum ether, colorless crystals melting between 65° C. and 66° C. being obtained; upon analysis this product was found to be 3-(N-tetramethylenecarbamyloxy)-pyridine.

5.8 grams of the product prepared as above described were dissolved in 50 cc. of benzene and the solution mixed with 7.7 grams of benzyl bromide. The mixture was then refluxed for 5½ hours and the viscous oil which formed separated and crystallized from a mixture of ethanol and ether. The crystals obtained melted between 162° C. and 164° C. Upon analysis the product was found to be the desired 1-benzyl-3-(N-tetramethylenecarbamyloxy)-pyridinium bromide.

*Example 6.*—33.3 grams of N-benzyl-N-methylcarbamyl chloride in 25 cc. of dry benzene were gradually added to a refluxing solution of 17.1 grams of 3-pyridol in a mixture of 200 cc. of benzene and 36.5 grams of triethylamine. The mixture was then refluxed for an additional 75 minutes, cooled, filtered and solvents removed from the filtrate under vacuum. A residual brown oil was obtained which distilled at 152° C. to 154° C. at 0.3 mm.; upon analysis it was found to be 3-(N-benzyl-N-methylcarbamyloxy)-pyridine.

5.0 grams of the product prepared as above described were dissolved in 30 cc. of benzene, 3.7 grams of benzyl bromide were added and the solution refluxed for 3 hours. The oil which formed was separated and recrystallized from a mixture of ethanol and ether. A colorless crystalline solid was obtained having a melting point of 136° C. to 137° C.; upon analysis it was found to be the desired 1-benzyl-3-(N-benzyl-N-methylcarbamyloxy)-pyridinium bromide.

*Example 7.*—38.9 grams of dibenzylcarbamyl chloride, dissolved in 20 cc. of benzene, were gradually added to a solution of 14.3 grams of 3-pyridol in a mixture of 175 cc. of benzene and 30.4 grams triethylamine. The reaction mixture was then refluxed for 2 hours, cooled, filtered, and the filtrate washed with aqueous caustic soda, then with water, and dried. Solvents were removed by distillation under vacuum and the residual oil distilled, a product boiling between 182° C. and 185° C. at 0.15 mm. being obtained; upon analysis this product was found to be dibenzylcarbamyloxy pyridine.

6.7 grams of the product prepared as above described were dissolved in benzene and 5.7 grams of benzyl bromide were added. The solution was then refluxed for one hour, the oil which formed recovered, and purified by dissolving it in ethanol and precipitating by addition of ether. Upon drying the purified oil, a white solid was obtained, which, upon analysis, was found to be 1-benzyl-3-(dibenzylcarbamyloxy)-pyridinium bromide.

*Example 8.*—7.95 grams of 2-naphthylmethyl chloride were dissolved in 35 cc. of benzene and the solution was added to a solution of 5 grams of 3-(dimethylcarbamyloxy)-pyridine in 15 cc. of benzene. The reaction mixture was then refluxed for 144 hours, the benzene decanted and the residual oil dissolved in absolute alcohol. Ether was then added to the alcohol solution and the oil which separated was recovered and dried. The resulting product was an amorphous solid which, upon analysis, was found to be the desired 3 - (dimethylcarbamyloxy)-1-(2-naphthylmethyl)-pyridinium chloride.

*Example 9.*—5.15 grams of benzyl bromide were added to 5.3 grams of 3-(dimethylcarbamyloxy)-6-methyl-pyridine (prepared by reacting 3-hydroxy-6-methyl-pyridine with dimethylcarbamyl chloride) and 10 cc. of benzene was then introduced. The reaction mass was then refluxed for one hour and permitted to cool. The solid formed was recovered by filtration, washed with benzene and crystallized from absolute alcohol. The crystals obtained melted at 204° C. to 206° C. and, upon analysis, were found to be 1-benzyl-3-(dimethylcarbamyloxy) - 6 - methyl-pyridinium bromide.

*Example 10.*—8.5 grams of anisyl bromide were added to 4.7 grams of 3-(dimethylcarbamyloxy)-pyridine and 10 cc. of benzene was then introduced. The mixture was permitted to stand for 2 days at room temperature, at the end of which time the oil which formed was separated by decantation, dissolved in absolute alcohol and precipitated out with ethyl ether. The oil was then dried in a vacuum desiccator, a yellow, amorphous solid being obtained. Upon analysis this product was found to be the desired 3-(dimethylcarbamyloxy)-1-(p-methoxybenzyl)-pyridinium bromide.

Since certain changes may be made in the compounds above described without departing from the scope of my invention, it is intended that all matter contained in the above description shall be interpreted as illustrative and not in a limiting sense.

I claim:

1. A compound selected from the group consisting of compounds having the structural formula

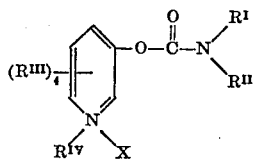

in which $R^I$ and $R^{II}$ denote radicals selected from the group consisting of alkyl, aralkyl, aryl, halogenated aryl and hydroaryl hydrocarbon radicals, and together may form a polymethylene radical containing not over 5 carbon atoms; $R^{III}$ denotes a member selected from the group consisting of hydrogen and lower aliphatic and araliphatic hydrocarbon radiicals; $R^{IV}$ denotes an aralkyl radical; and X denotes a quaternizing anion.

2. The compounds of claim 1 in which $R^{III}$ denotes hydrogen.

3. The compound 1-benzyl-3-(dimethylcarbamyloxy)-pyridinium bromide having the structural formula

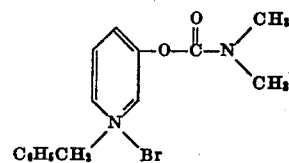

4. The compound 1-benzyl-3-(methylbenzylcarbamyloxy)-pyridinium bromide having the structural formula

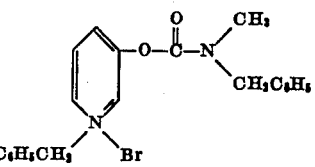

5. The compound 3-(dimethylcarbamyloxy)-1-(p-nitrobenzyl)-pyridinium bromide having the structural formula

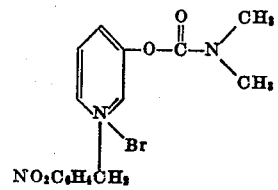

HEINZ M. WUEST.

No references cited.